(12) United States Patent
Howlett et al.

(10) Patent No.: US 10,768,913 B2
(45) Date of Patent: Sep. 8, 2020

(54) METHOD FOR PERFORMING DEEP STATIC ANALYSIS WITH OR WITHOUT SOURCE CODE

(71) Applicant: Oracle International Corporation, Redwood Shores, CA (US)

(72) Inventors: Liam Richard Howlett, Ottawa (CA); Robert David Gardner, Fort Collins, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/264,373

(22) Filed: Jan. 31, 2019

(65) Prior Publication Data

US 2020/0065076 A1    Feb. 27, 2020

Related U.S. Application Data

(60) Provisional application No. 62/721,638, filed on Aug. 23, 2018.

(51) Int. Cl.
*G06F 9/44*    (2018.01)
*G06F 11/36*    (2006.01)
(Continued)

(52) U.S. Cl.
CPC ..................... *G06F 8/43* (2013.01)

(58) Field of Classification Search
CPC ...... G06F 16/2365; G06F 8/4442; G06F 8/41; G06F 8/75; G06F 8/71; G06F 12/0875; G06F 12/28; G06F 11/2082; G06F 11/3604; G06F 11/3612; G06F 11/3624; G06F 11/2247; G06F 8/433; G06F 9/3859; G06F 9/30043; G06F 9/3836; G06F 9/3891; G06F 12/0862; G06F 8/43; G06F 16/245; G06F 21/577; G06F 2221/033; G06F 8/443; G06F 8/314; G06F 8/456
See application file for complete search history.

(56) References Cited

U.S. PATENT DOCUMENTS 5,313,616 A * 5/1994 Cline .................. G06F 11/3612
                                                          713/323
5,946,486 A    8/1999 Pekowski
(Continued)

FOREIGN PATENT DOCUMENTS

CN        106021116 B      7/2018

OTHER PUBLICATIONS

Kilic et al., Generating runtime verification specifications based on static code analysis alerts, 6 pages (Year: 2017).*
(Continued)

*Primary Examiner* — Thuy Dao
(74) *Attorney, Agent, or Firm* — Ferguson Braswell Fraser Kubasta PC

(57) ABSTRACT

A method may include initiating a static analysis of code including a first function, detecting, in the first function and by the static analysis, an indirect call to a second function whose identity is unknown until the code is executed, detecting, in the code, a conditional block including a first instruction sequence and a second instruction sequence, determining, by the static analysis, that the first instruction sequence sets a value that identifies the second function, and adding the value to a called function list for the code.

20 Claims, 8 Drawing Sheets

(51) Int. Cl.
*G06F 8/41* (2018.01)
*G06F 9/50* (2006.01)

(56) References Cited

U.S. PATENT DOCUMENTS

| | | | |
|---|---|---|---|
| 6,205,545 B1 | 3/2001 | Shah et al. | |
| 8,151,253 B2 | 4/2012 | Sharma et al. | |
| 8,739,135 B2 | 5/2014 | Eigler | |
| 9,311,217 B2* | 4/2016 | Krauss | G06F 11/3604 |
| 9,361,102 B2* | 6/2016 | Tan | G06F 9/30058 |
| 9,367,427 B2 | 6/2016 | Andre et al. | |
| 9,442,725 B2 | 9/2016 | Madampath | |
| 9,639,365 B2 | 5/2017 | Coon et al. | |
| 9,767,284 B2* | 9/2017 | Ghose | G06F 9/3877 |
| 10,353,802 B2* | 7/2019 | Cook | G06F 11/3644 |
| 2003/0051234 A1* | 3/2003 | Schmidt | G06F 9/4491 |
| | | | 717/158 |
| 2007/0083856 A1* | 4/2007 | Chilimbi | G06F 11/3612 |
| | | | 717/128 |
| 2008/0313326 A1* | 12/2008 | Maruyama | G06F 13/102 |
| | | | 709/224 |
| 2010/0011209 A1* | 1/2010 | Kiriansky | G06F 21/53 |
| | | | 713/166 |
| 2011/0078378 A1* | 3/2011 | Suzuki | G06F 9/445 |
| | | | 711/118 |
| 2011/0321021 A1* | 12/2011 | Chen | G06F 8/4442 |
| | | | 717/157 |
| 2012/0331445 A1* | 12/2012 | Centonze | G06F 8/443 |
| | | | 717/110 |
| 2014/0215431 A1* | 7/2014 | Haviv | G06F 8/20 |
| | | | 717/104 |
| 2014/0282431 A1* | 9/2014 | Delio, Jr. | G06F 11/3466 |
| | | | 717/130 |

OTHER PUBLICATIONS

Wu et al., Static Analysis of Runtime Errors in Interrupt-Driven Programs via Sequentialization, 26 pages (Year: 2016).*
Brad Calder et al., "Reducing Indirect Function Call Overhead in C++ Programs"; ACM Priniciples and Practice of Programming Language; Portland, Oregon; 1994 (11 pages).
Changhee Park et al., "Static analysis of JavaScript libraries in a scalable and precise way using loop sensitivity"; Extended Conference Paper; Softw. Pract. Exper.; Sep. 18, 2017 (34 pages).

* cited by examiner

Translated Code Snippet A (Main) 420

Translated Direct Call A 422A

Translated Direct Call B 422B

Translated Indirect Call 424

```
push    %rbp
mov     %rsp,%rbp
sub     $0x20,%rsp
mov     %edi,-0x14(%rbp)
mov     %rsi,-0x20(%rbp)
mov     -0x20(%rbp),%rax
add     $0x8,%rax
mov     (%rax),%rax
mov     %rax,%rdi
callq   4004e0 <atoi@plt>
mov     %eax,-0xc(%rbp)
mov     -0xc(%rbp),%eax
mov     %eax,%edi
callq   400627 <getFP>
mov     %rax,-0x8(%rbp)
mov     -0x8(%rbp),%rax
callq   *%rax
nop
leaveq
retq
```

FIG. 4B

METHOD FOR PERFORMING DEEP STATIC ANALYSIS WITH OR WITHOUT SOURCE CODE

CROSS-REFERENCE TO RELATED APPLICATIONS

This application claims benefit under 35 U.S.C. § 119(e) to U.S. Provisional Patent Application Ser. No. 62/721,638, filed on Aug. 23, 2018, having the same inventors, and entitled "METHOD FOR PERFORMING DEEP STATIC ANALYSIS WITH OR WITHOUT SOURCE CODE." U.S. Provisional Patent Application Ser. No. 62/721,638 is incorporated herein by reference in its entirety.

BACKGROUND

It may be useful to know whether a given function in a software application may potentially be called. For example, a static analysis (e.g., the secure computing mode, or seccomp utility of Linux) may seek to determine whether specific system calls are invoked by an application. In addition, a need may exist to perform the static analysis without analyzing source code, which may be out of date or unavailable, for example, when executing cloud-based applications, or when analyzing binary blobs. Typically, tools that analyze compiled applications use dynamic tracing, where the application is executed to discover what calls are actually made. However, dynamic tracing may result in an incomplete set of calls since the dynamically observed calls depend on the specific inputs and code paths exercised during a particular execution.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including initiating a static analysis of code including a first function, detecting, in the first function and by the static analysis, an indirect call to a second function whose identity is unknown until the code is executed, detecting, in the code, a conditional block including a first instruction sequence and a second instruction sequence, determining, by the static analysis, that the first instruction sequence sets a value that identifies the second function, and adding the value to a called function list for the code.

In general, in one aspect, one or more embodiments relate to a system including a repository configured to store code including a first function, and a called functions list for the code, a memory coupled to a computer processor, and a tracing tool, executing on the computer processor and using the memory, configured to initiate a static analysis of the code, detect, in the first function and by the static analysis, an indirect call to a second function whose identity is unknown until the code is executed, detect, in the code, a conditional block including a first instruction sequence and a second instruction sequence, determine, by the static analysis, that the first instruction sequence sets a value that identifies the second function, and add the value to the called function list.

In general, in one aspect, one or more embodiments relate to a non-transitory computer readable medium including instructions that, when executed by a computer processor, perform: initiating a static analysis of code including a first function, detecting, in the first function and by the static analysis, an indirect call to a second function whose identity is unknown until the code is executed, detecting, in the code, a conditional block including a first instruction sequence and a second instruction sequence, determining, by the static analysis, that the first instruction sequence sets a value that identifies the second function, and adding the value to a called function list for the code.

Other aspects of the invention will be apparent from the following description and the appended claims.

BRIEF DESCRIPTION OF DRAWINGS

FIG. 4A, FIG. 4B, and FIG. 4C show examples in accordance with one or more embodiments of the invention.

DETAILED DESCRIPTION

Figure 1A:
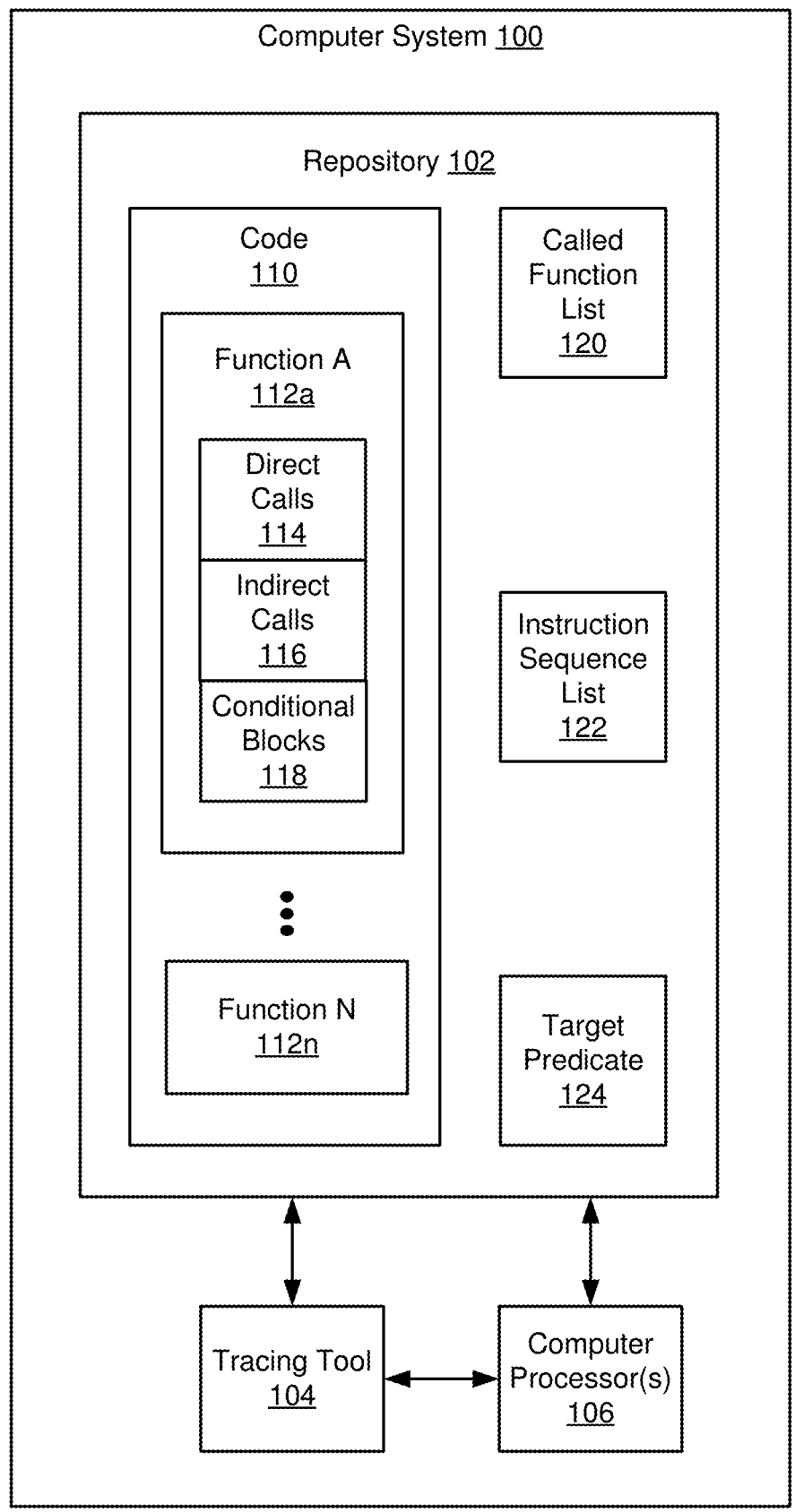
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to determining the functions that may be called in code. In one or more embodiments, the code may be compiled code or dynamically linked code (i.e., access to source code written in a high-level language is not required). The code may be analyzed to detect indirect calls to functions whose identity is unknown until the code is executed. For example, an indirect call may identify a function via a function pointer variable or via a reflection capability of a high-level programming language. In one or more embodiments, a conditional block is detected that includes alternative instruction sequences that set a value used to identify the indirectly called function. For example, each alternative instruction sequence may set the value of a function pointer used in the indirect call. A data flow may be traced back to each value that identifies each indirectly called function.

The possibly called functions may be accumulated in a called function list. The called function list may be filtered using a target predicate, such as whether a function calls a system function and/or a security-sensitive function. For example, the filtered called function list may be used to perform a security analysis (e.g., similar to the Linux seccomp utility), or to configure a security infrastructure for executing the code.

FIG. 1A shows a computer system (100) in accordance with one or more embodiments of the invention. As shown in FIG. 1A, the computer system (100) includes a repository (102), a tracing tool (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), a called function list (120), an instruction sequence list (122), and a target predicate (124). In one or more embodiments, the code (110) may be any collection of source code including various software components. That is, the code (110) may be any collection of computer instructions (e.g., statements) written in a human-readable programming language, or intermediate representation (e.g., byte code). The code (110) may be transformed by a compiler into binary machine code. Compiled machine code may be executed by the processor (106) in order to execute the software components generated from the code (110). In one or more embodiments, the code (110) may be any collection of object code (e.g., machine code generated by a compiler) or another form of the code (110). For example, the code (110) may be dynamically linked code (e.g., for a shared library) or an archive file that packages compiled components.

In one or more embodiments, the code (110) includes functions (112a, 112n). In one or more embodiments, a function (112a) is a portion of the code (110) that generates zero or more outputs in response to zero or more inputs. Examples of functions (112a, 112n) include methods, procedures, etc. In one or more embodiments, a function (112a) includes direct calls (114), indirect calls (116), and conditional blocks (118). In one or more embodiments, a direct call (114) explicitly identifies a function to be called. The identity of the of the directly called function may be known at compile-time. For example, a direct call (114) may explicitly identify a function by name, or by a memory address in the computer system (100) indicating the location of the instructions that define the function.

In contrast, in one or more embodiments, an indirect call (116) implicitly identifies a function to be called. The identity of the indirectly called function may be unknown until the code (110) is executed. For example, an indirect call (116) may identify the function using a function pointer variable whose value is a memory address in the computer system (100). The value of the function pointer variable may depend on how the code (110) is executed (e.g., which instruction sequences of the code (110) are executed). In one or more embodiments, the indirect call (116) uses a reflection capability that enables code to modify its structure and/or behavior at runtime. For example, the Java reflection facility provides reflective calls, such as the method invoke, which may invoke different functions (e.g., methods) depending on the type of a runtime object.

Figure 1B:
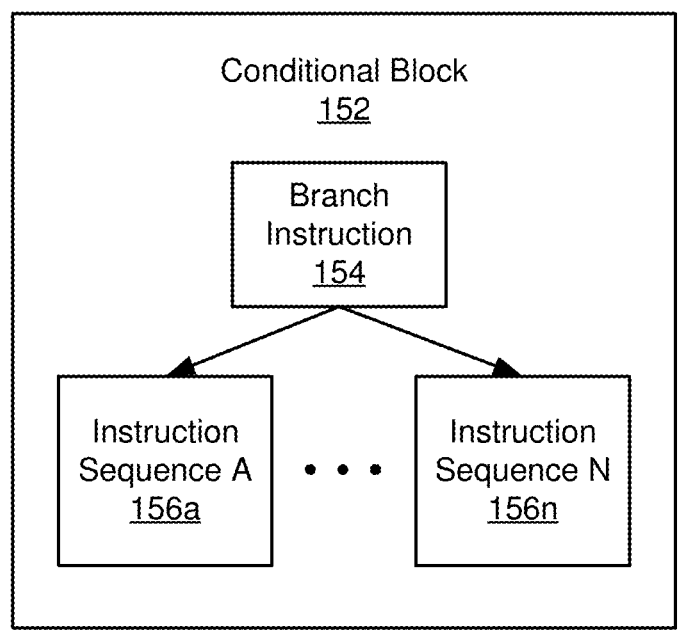

In one or more embodiments, a conditional block (118) represents multiple alternate execution flows. Turning to FIG. 1B, a conditional block (152) may include a branch instruction (154) and instruction sequences (156a, 156n). The branch instruction (154) may represent a point in the code where the flow of execution is altered. That is, execution may proceed linearly according to an instruction sequence within the code until the branch instruction (154) causes a divergence into multiple alternative instruction sequences (156a, 156n). Each of the instruction sequences (156a, 156n) may include a sequence of one or more instructions.

In one or more embodiments, one or more of the instruction sequences (156a, 156n) set the value (e.g., the value of a function pointer variable) used to identify an indirectly called function. In one or more embodiments, the branch instruction (154) selects one of the instruction sequences (156a, 156n) based on a value (e.g., a Boolean value) evaluated at runtime. For example, in the code snippet below, the conditional block (152) corresponds to an if statement, and the branch instruction (154) is the comparison instruction x==0. In this example, the previous instruction sequence branches, following the branch instruction (154), into two alternative instruction sequences, z=f(y) and z=g(y).

If x==0 then z=f(y) else z=g(y);
Print z;

In one or more embodiments, the alternative instruction sequences (156a, 156n) may merge back into the previous instruction sequence at a merge point. In the code snippet above, the merge point for the alternative sequences (i.e., z=f(y) and z=g(y)) is the Print z instruction, where the value of z depends on which alternative instruction sequence (i.e., z=f(y) or z=g(y)) is executed at runtime.

Returning to FIG. 1A, in one or more embodiments, the processor (106) includes functionality to execute the code (110). In one or more embodiments, the processor (106) includes functionality to execute the tracing tool (104).

In one or more embodiments, the tracing tool (104) may be implemented in hardware (e.g., circuitry), software, firmware, and/or any combination thereof. In one or more embodiments, the tracing tool (104) is implemented as part of a compiler. The tracing tool (104) may include functionality to detect direct calls (114), indirect calls (116) and/or conditional blocks (118) in the code (110) (e.g., in a function (112a)). The tracing tool (104) may include functionality to determine the identity of a function invoked in an indirect call (116). The tracing tool (104) may include functionality to generate an alert when a function in the called function list (120) satisfies the target predicate (124). The tracing tool (104) may include functionality to configure a runtime security mechanism using the called function list (120) and the target predicate (124).

In one or more embodiments, the called function list (120) includes functions (112a, 112n) that may be called by the code (110). In one or more embodiments, each entry in the called function list (120) includes an identifier for a function (112a). For example, the identifier may be a memory address where the function (112a) is stored. Continuing this example, the memory address may indicate the location in a memory of the computer system (100) (e.g., in the non-persistent storage (504) or the persistent storage (506) described with respect to FIG. 5A and the accompanying description below). In one or more embodiments, the identifier indicates a name of a function (112a).

In one or more embodiments, a function (112a) in the called function list (120) is called by at least one instruction in the code (110) that is reachable from an entry point of the code (110). An entry point may be a function (112a) that is invoked by software that is external to the code (110). Examples of entry points include the main function and/or any function exposed via an application programming interface (API). For example, a function (112a) in the called function list (120) may be called by an entry point, or may be called by a function that is called by an entry point, etc.

In one or more embodiments, the instruction sequence list (122) includes instruction sequences in the code (110) to be examined by the tracing tool (104). In other words, the instruction sequence list (122) may function as a work list of instruction sequences to be examined. In one or more embodiments, an entry in the instruction sequence list (122) indicates a memory address that stores the first instruction in an instruction sequence (e.g., an instruction sequence (156a) in FIG. 1B). In one or more embodiments, an entry in the instruction sequence list (122) indicates a memory address where a function (112a) is stored.

In one or more embodiments, the target predicate (124) is a predicate that, when satisfied, indicates the presence of a condition of interest to an analysis of the code (110). For example, in the context of a security analysis (e.g., similar to the Linux seccomp utility), the target predicate (124) may indicate whether a function (112a) accesses a security-sensitive resource (e.g., the kernel, the frame buffer, etc.) of the computer system (100). Continuing this example, any function (112a) satisfying the target predicate (124) may represent a potential security vulnerability in the code (110). In one or more embodiments, the target predicate (124) indicates whether a function (112a) is included in a list of specific (e.g., named) functions.

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
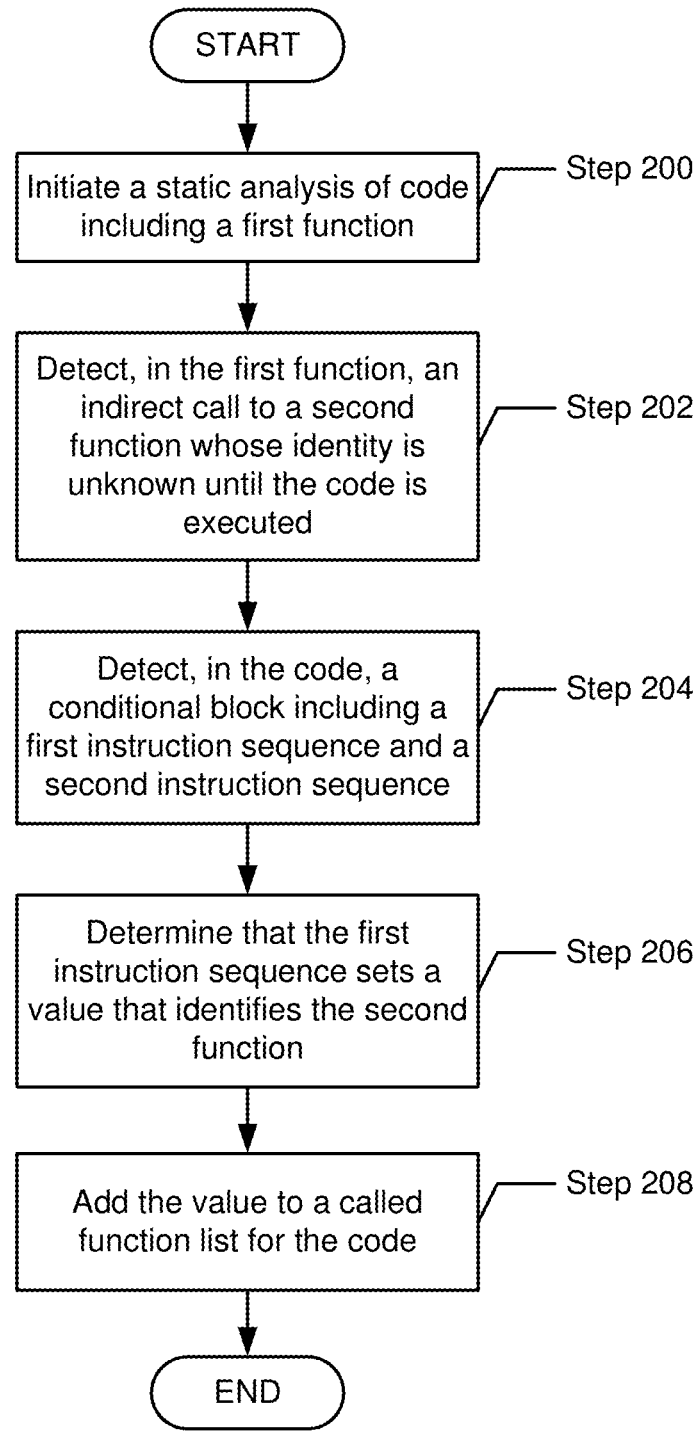
FIG. 2 and FIG. 3 show flowcharts in accordance with one or more embodiments of the invention.

FIG. 2 shows a flowchart in accordance with one or more embodiments of the invention. The flowchart depicts a process for deep static analysis. One or more of the steps in FIG. 2 may be performed by the components (e.g., the tracing tool (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a static analysis of code is initiated. In one or more embodiments, the static analysis is a method of analyzing the code without executing the code. The code may be obtained from a repository. The code may include a first function that is an entry point of the code.

In Step 202, an indirect call to a second function is detected in the first function by the static analysis. In one or more embodiments, the tracing tool may detect the indirect call while examining an instruction sequence of the first function. For example, the tracing tool may detect the indirect call when the value of a function pointer variable is used to call a function. As another example, the tracing tool may detect the indirect call when a value obtained from the contents of a register is used to call a function.

In Step 204, a conditional block is detected in the code. In one or more embodiments, the conditional block and the indirect call detected in Step 202 are in the same function. For example, both the indirect call and the conditional block may be in the main function. In this first scenario, the tracing tool may detect the conditional block by examining the instructions of the first function in the backward direction, starting from the instruction that includes the indirect call, until the conditional block is reached.

Alternatively, in one or more embodiments, the conditional block and the indirect call are in different functions. For example, the indirect call may be in the main function, and the conditional block may be in a third function called by the main function. In this second scenario, the tracing tool may first attempt to detect the conditional block by examining the instructions of the first function (e.g., main function) in the backward direction, starting from the instruction that includes the indirect call. However, when the tracing tool encounters the call to the third function during the backwards traversal of the first function, the tracing tool may suspend its attempt to detect the conditional block in the first function, and initiate an attempt to detect the conditional block in the third function. For example, the tracing tool may then detect the conditional block by examining the instructions of the third function in the backward direction, beginning with a last instruction to be executed in an instruction sequence of the third function (e.g., a return instruction). If the tracing tool is unable to detect a conditional block in the third function, then the tracing tool may resume its attempt to detect the conditional block in the first function. For example, the tracing tool may resume the examination of the instructions of the first function in the backward direction, beginning with the instruction immediately preceding to the call to the third function.

In Step 206, a determination is made, by the static analysis, that an instruction sequence of the conditional block sets a value that identifies the second function. For example, the instruction sequence may provide a function name that is accessed by the indirect call, or the instruction sequence may set the value of a function pointer accessed by the indirect call. In addition, other instruction sequences of the conditional block may also set a value that identifies the second function. Thus, the identity of the second function may depend on which alternative instruction sequence is executed as a result of executing the branch instruction of the conditional block.

In one or more embodiments, edges terminating on nodes corresponding to each of the possible functions identified by the indirect call (e.g., where each possible function corresponds to an alternative instruction sequence that set the value that identifies the second function) are added to a call graph that models possible execution flows of the code. For example, if the indirect call is in the main function, a call graph edge may be added from the main function to each of the possible functions identified by the indirect call.

In one or more embodiments, if none of the instruction sequences of the conditional block detected in Step 204 set a value that identifies the second function, then the tracing tool may continue searching the first function for a conditional block that sets the value that identifies the second function (see description of Step 204 above). For example, the tracing tool may resume the backward trace of the first function starting from the call to the third function.

In Step 208, the value is added to the called function list for the code. In one or more embodiments, the value is added to the called function list only if the value satisfies a target predicate. In one or more embodiments, the target predicate may be implemented by a function that queries a list of functions of interest (e.g., set by a user) to determine whether a specific function is of interest.

In one or more embodiments, the called function list is used to configure a security infrastructure that may be used when executing the code. For example, the tracing tool may generate an alert (e.g., a compile-time alert) when a function in the called function list satisfies the target predicate. Alternatively, the tracing tool may instrument the code to intercept (e.g., and generate a runtime error message), when the code is executed, a call to a function in the called function list satisfying the target predicate.

In one or more embodiments, the called function list is used to determine the coverage of a test instruction sequence when applied to the code, where the called function list corresponds to functions exercised by the test instruction sequence.

Figure 3:
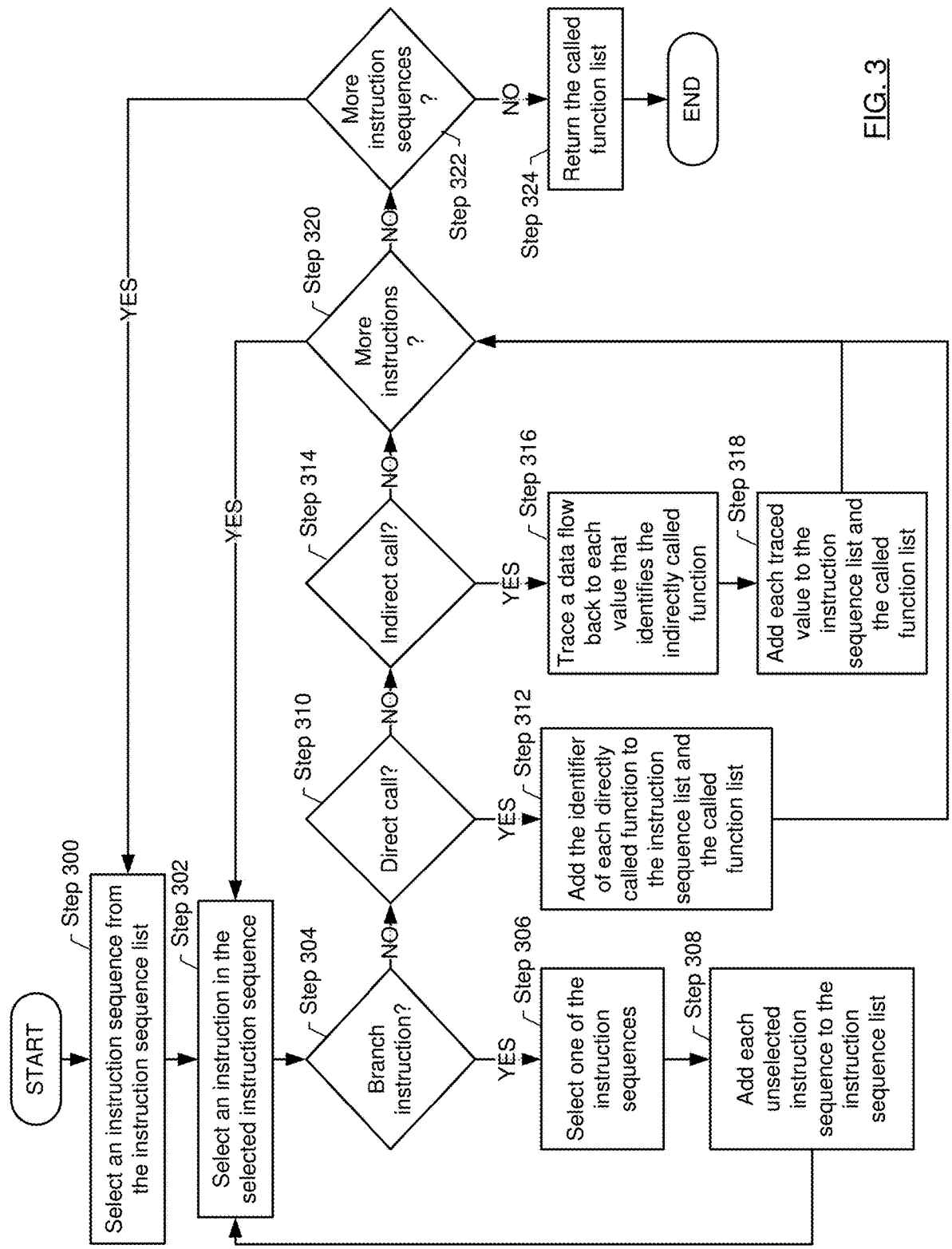

FIG. 3 shows a flowchart in accordance with one or more embodiments of the invention. The flowchart depicts a process for deep static analysis. One or more of the steps in FIG. 3 may be performed by the components (e.g., the tracing tool (104) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, an instruction sequence in the instruction sequence list is selected. In one or more embodiments, the next un-selected instruction sequence in the instruction sequence list is selected. In one or more embodiments, the tracing tool initializes the instruction sequence list to the instruction sequence of each entry point in the code (e.g., to ensure that the tracing tool examines all instruction sequences that are reachable from any entry point of the code). For example, the tracing tool may add the location of the first instruction in each entry point to the instruction sequence list. Subsequent steps (e.g., Step 308, Step 312, and Step 318 below) may add additional instruction sequences to the instruction sequence list. The tracing tool may select, in successive iterations of Step 300, the various instruction sequences in the instruction sequence list. In one or more embodiments, each instruction sequence in the instruction sequence list is selected exactly once. For example, un-selected instruction sequences may be selected until the instruction sequence list is empty.

In Step 302, an instruction in the selected instruction sequence is selected. In one or more embodiments, the tracing tool selects the next un-selected instruction in the selected instruction sequence. For example, the tracing tool may select the instructions in the selected instruction sequence sequentially in successive iterations of Step 302. Continuing this example, the tracing tool may examine the instructions in ascending order of the memory addresses at which the instructions are stored. In one or more embodiments, the tracing tool selects each instruction in the selected instruction sequence exactly once. For example, the tracing tool may select un-selected instructions until no un-selected instructions remain in the selected instruction sequence.

If, in Step 304 a determination is made that the selected instruction is a branch instruction of a conditional block, then Step 306 below is executed. For example, the selected instruction may be an if statement, a switch statement, etc.

Otherwise, if in Step 310 a determination is made that the selected instruction includes a direct call, then Step 312 below is executed for each direct call in the selected instruction. For example, the selected instruction may call a function by name or by a specific memory address.

Otherwise, if in Step 314 a determination is made that the selected instruction includes an indirect call, then Step 316 below is executed for each indirect call in the selected instruction. For example, the selected instruction may call a function using the value of a function pointer variable or register contents.

Otherwise, if in Step 320 a determination is made that additional un-selected instructions remain in the selected instruction sequence, then Step 302 above is again executed to select another un-selected instruction in the selected instruction sequence.

Otherwise, if in Step 322 a determination is made that additional un-selected instruction sequences remain in the instruction sequence list, then Step 300 above is again executed to select another un-selected instruction sequence in the instruction sequence list.

Otherwise, in Step 324 the called function list is returned, since all of the instructions in all of the instruction sequences in the instruction sequence list have now been processed. In one or more embodiments, the tracing tool issues a report that includes, for each function in the called function list, the values of arguments to the function at each invocation of the function, and the location (e.g., line number) of the invocation in the code. In one or more embodiments, the tracing tool only includes functions satisfying the target predicate in the report. Then, the process ends.

In Step 306, one of the instruction sequences in the conditional block is selected for processing. For example, the tracing tool may select the first instruction sequence in the conditional block. Continuing this example, the "then" instruction sequence may be selected in an "if" statement.

In one or more embodiments, the tracing tool suspends processing of the previously selected instruction sequence in Step 300 above until the tracing tool completes processing the instruction sequence selected in Step 306. In other words, the tracing tool may process the instructions in the conditional block that includes the branch instruction detected in Step 304 before continuing to process the instructions in the instruction sequence selected in Step 300 above. For example, this scenario may correspond to processing instruction sequences in a depth-first manner.

Alternatively, the tracing tool may delay processing the instruction sequences in the conditional block that includes the branch instruction detected in Step 304 until after the tracing tool completes processing the instruction sequence selected in Step 300 above. For example, this scenario may correspond to processing instruction sequences in a breadth-first manner.

In Step 308, each un-selected instruction sequence in the conditional block is added to the instruction sequence list. The tracing tool may process (e.g., select from the instruction sequence list) each un-selected instruction sequence in a subsequent iteration of Step 300 above. Then Step 302 above is again executed to select another un-selected instruction in the selected instruction sequence.

In Step 312, the identifier (e.g., function name or memory address) of each directly called function in the selected instruction is added to the called function list. In one or more embodiments, the tracing tool adds functions satisfying the target predicate to the called function list. The tracing tool may also add the identifier of each called function to the instruction sequence list (e.g., so that the instruction sequence that implements the called function may also be examined for called functions satisfying the target predicate). For example, the tracing tool may add the location of the first instruction in the called function to the instruction sequence list. Then, Step 320 above is executed to determine whether additional un-selected instructions remain in the selected instruction sequence.

In Step 316, a data flow is traced back to each value that identifies each indirectly called function in the selected instruction. In one or more embodiments, one or more data flows set the value (e.g., a function identifier or memory location) of the indirectly called function. For example, each data flow may correspond to an instruction sequence that includes instruction sub-sequences from one or more conditional blocks in one or more functions. In one or more embodiments, when the data flow includes an instruction sequence of a conditional block, the tracing tool searches each alternative instruction sequence of the conditional block for one or more instructions that set the value of the indirectly called function.

In one or more embodiments, the tracing tool may trace the flow of the value that identifies the indirectly called function as the value is transferred among one or more registers and/or memory locations.

In one or more embodiments, the value that identifies the indirectly called function flows is obtained from an external source (e.g., a user). In this scenario, the tracing tool may add a special identifier (e.g., "externally identified function" or "user-identified function") to the called function list corresponding to the unknown function.

In Step 318, each traced value is added to the called function list and the instruction sequence list (see description of Step 312 above). Then, Step 320 above is executed to determine whether additional un-selected instructions remain in the selected instruction sequence.

Figure 4A:
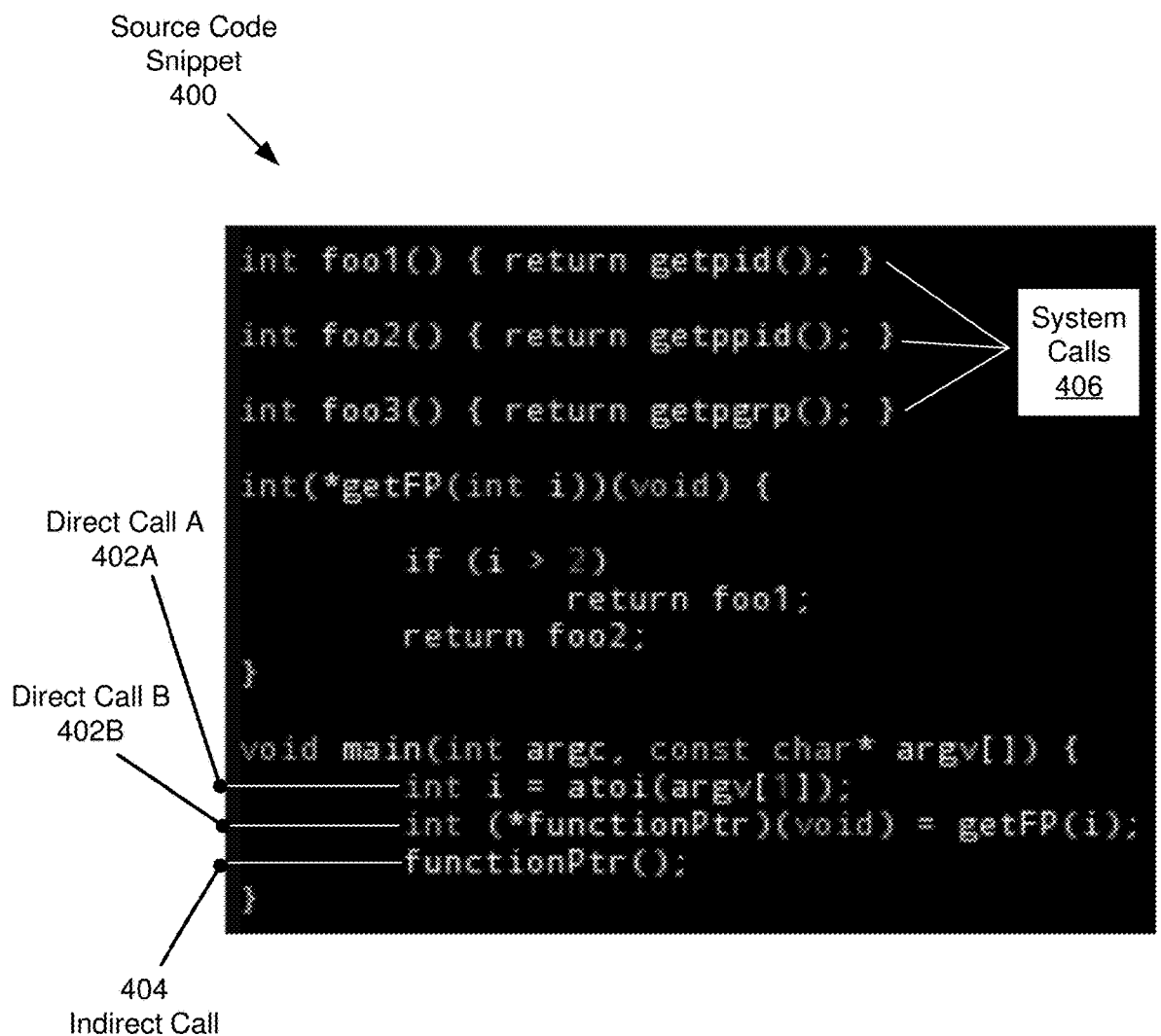
Figure 4C:
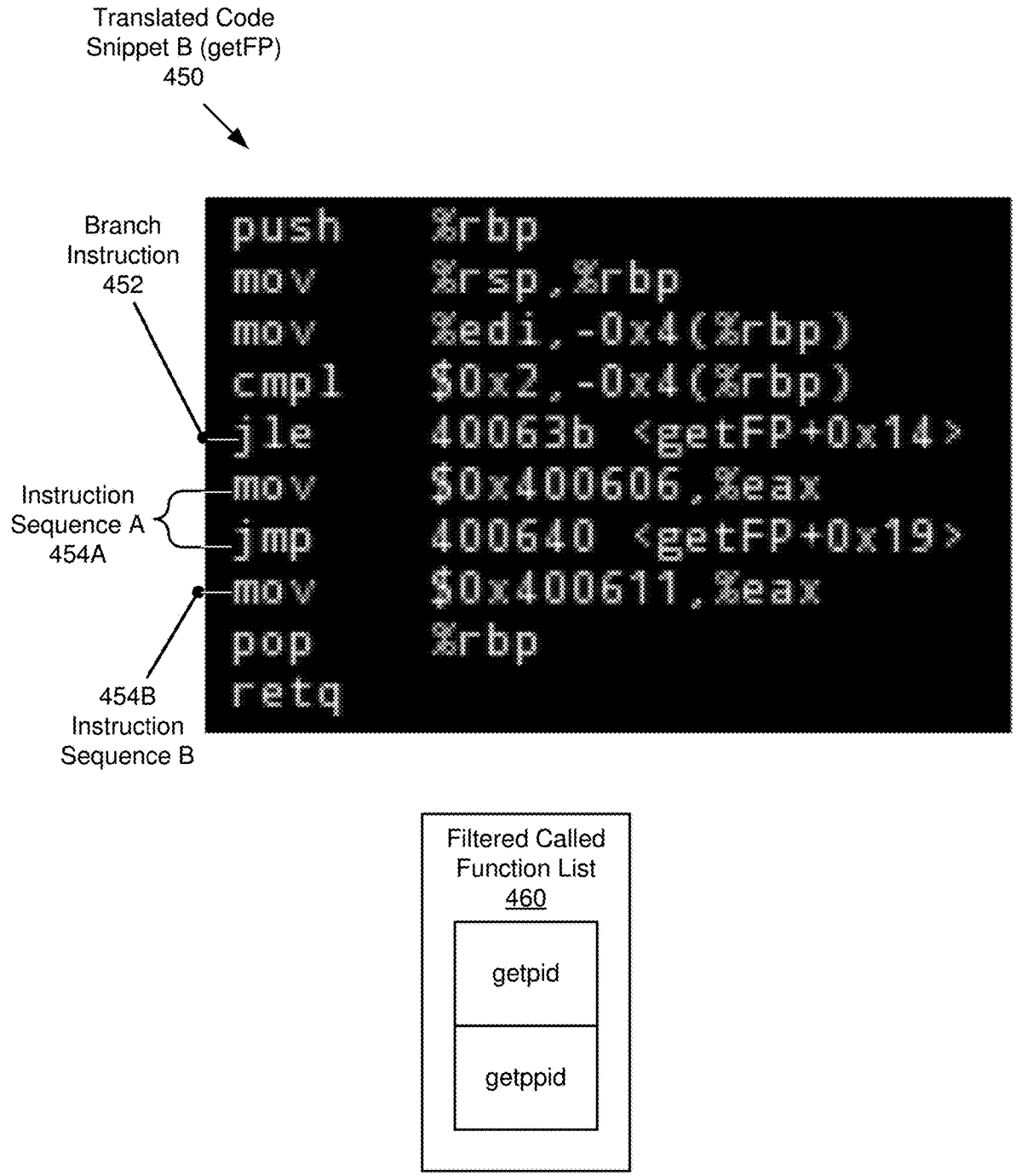

The following example is for explanatory purposes only and not intended to limit the scope of the invention. FIG. 4A, FIG. 4B, and FIG. 4C show an implementation example in accordance with one or more embodiments of the invention. FIG. 4A illustrates a source code snippet (400) ((110) in FIG. 1A) that includes direct calls (402A, 402B) ((114) in FIG. 1A), an indirect call (404) ((116) in FIG. 1A) of a function ((112a) in FIG. 1A), and system calls (406). Direct call A (402A) calls the built-in function atoi, and direct call B (402B) calls the user-defined function getFP. The indirect call (404) calls either the function foo1 or the function foo2, depending on the value of a function pointer variable. The functions foo1, foo2, and foo3 make system calls (406) to the kernel of the computer system ((100) in FIG. 1A).

The source code snippet (400) is translated to machine code. FIG. 4B shows the instruction sequence of translated code snippet A (420) corresponding to the main function, the entry point to the source code snippet (400). Translated code snippet A (420) includes translated direct calls (422A, 422B) corresponding to the direct calls (402A, 402B) of FIG. 4A, and a translated indirect call (424) corresponding to the indirect call (404) of FIG. 4A. Translated code snippet A (420) of FIG. 4B and translated code snippet B (450) of FIG. 4C are written using x86 assembly code. However, x86 assembly code is used solely as an illustrative example, and is not meant to constrain embodiments on other processor architectures (e.g., ARM, SPARC, Itanium, MIPS, IBM 360, PDP-11, etc.).

The tracing tool ((104) in FIG. 1A) begins its analysis of translated code snippet A (420) by adding the main function to both the called function list ((120) in FIG. 1A) and the instruction sequence list ((122) in FIG. 1A). During the course of its execution, the tracing tool selects and processes each function (once) in the instruction sequence list until the instruction sequence list is empty. The tracing tool processes each function to determine which functions are called by the function, whether directly or indirectly.

When analyzing the instructions in the instruction sequence of translated code snippet A (420), the tracing tool encounters translated direct call A (422A) and adds the identifier (e.g., the memory address) of the directly called function atoi to both the called function list and the instruction sequence list. Continuing its analysis of the instruction sequence of translated code snippet A (420), the tracing tool encounters translated direct call B (422B) and adds the identifier of the directly called function getFP to both the called function list and the instruction sequence list.

Continuing its analysis of the instruction sequence of translated code snippet A (420), the tracing tool encounters the translated indirect call (424). To determine the identity of the indirectly called function, the tracing tool starts tracing the data flow to the value of the rax register used in the translated indirect call (424). The tracing tool begins tracing the instruction sequence of translated code snippet A (420) backwards from the translated indirect call (424), and encounters translated direct call B (422B), which calls the function getFP. Then, the tracing tool starts tracing the function getFP to search for an instruction that sets the value that flows in the rax register used in the translated indirect call (424).

Translated code snippet B (450), which corresponds to the function getFP, is shown in FIG. 4C. The tracing tool traces the instruction sequence of translated code snippet B (450) backwards, starting from the return statement, and encounters instruction sequence B (454B), which consists of a single mov (i.e., move) instruction that sets the value that flows into the rax register used in the translated indirect call (424) of FIG. 4B. The tracing tool adds the traced value, in this case, the memory address of the function foo2, to both the called function list and the instruction sequence list.

Continuing its trace of the instruction sequence of translated code snippet B (450), the tracing tool encounters the instruction sequence A (454A), which consists of: 1) a mov instruction that sets the value that flows into the rax register used in the translated indirect call (424), and 2) a jmp (i.e., jump) instruction that jumps over instruction sequence B (454B). The tracing tool determines that it has encountered a conditional block that includes instruction sequence A (454A), instruction sequence B (454B), in addition to a branch instruction (452). The tracing tool adds the traced value, in this case, the memory address of the function foo1, to both the called function list and the instruction sequence list.

When the tracing tool selects foo1 from the instruction sequence list, the tracing tool encounters the system call to getpid, and adds getpid to the called function list. Similarly, when the tracing tool selects foo2 from the instruction sequence list, the tracing tool encounters the system call to getppid, and adds getppid to the called function list.

The tracing tool checks whether each function in the called function list satisfies a target predicate ((124) in FIG. 1A). In this case, the target predicate is whether the function is a system call. The tracing tool then filters the called function list using the target predicate. The only functions in the called function list that are system calls are getpid and getppid, as shown in the filtered called function list (460). The function foo3 is never examined or added to either the called function list or the instruction sequence list because foo3 is not reachable from the entry point main to the source code snippet ((400) of FIG. 4A).

Figure 5A:
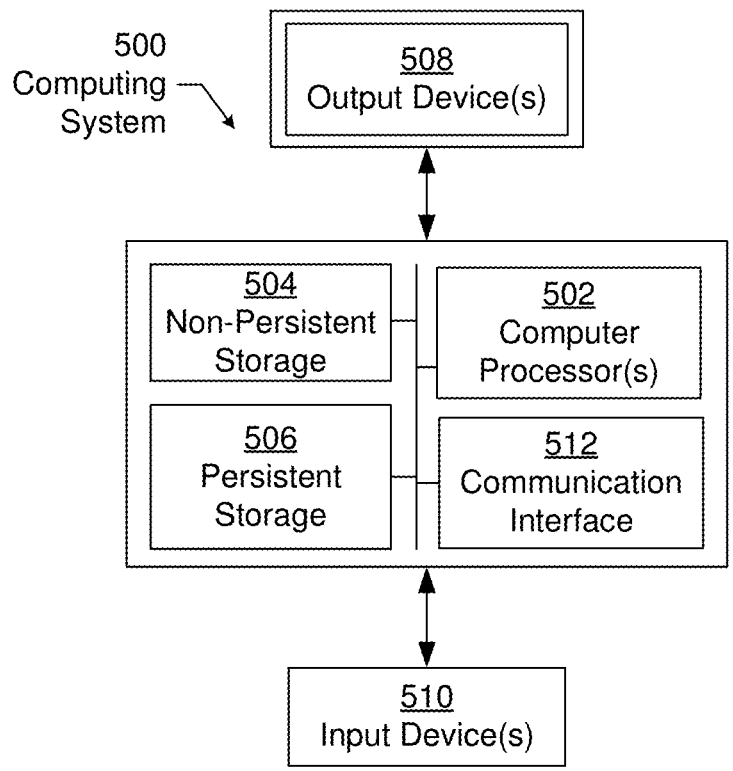
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
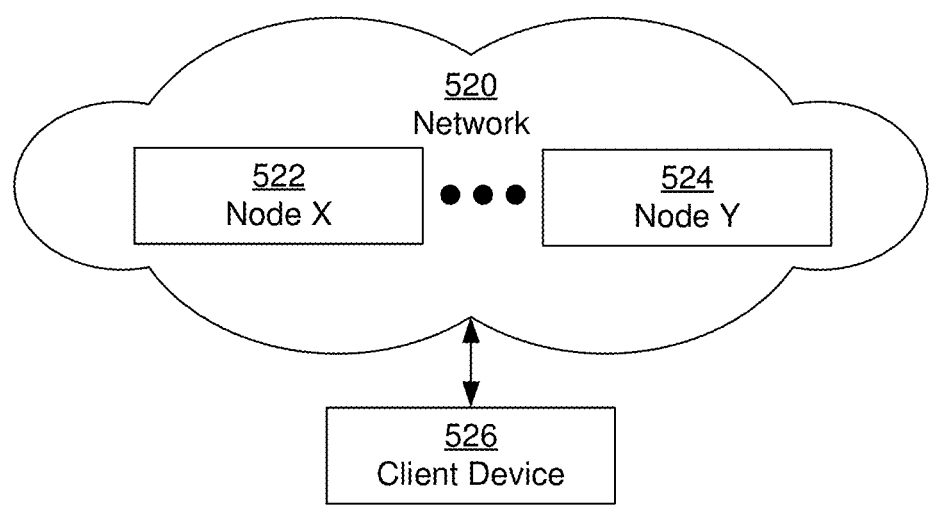

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   initiating a static analysis of object code comprising a first function, wherein the object code is generated from source code, and wherein the object code is external to the source code;
   detecting, in the first function of the object code and by the static analysis of the object code, an indirect call to a second function of the object code whose identity is unknown until the object code is executed;
   detecting, in the object code, a conditional block comprising a first instruction sequence and a second instruction sequence;
   determining, by the static analysis, that the first instruction sequence sets a first value that identifies the second function; and
   adding the first value to a called function list for the object code.

2. The method of claim 1, further comprising:
   determining that the second instruction sequence sets a second value that identifies the second function; and
   adding the second value to the called function list.

3. The method of claim 1, further comprising:
   generating an alert when a function in the called function list satisfies a target predicate.

4. The method of claim 1, further comprising:
   instrumenting the object code to intercept, when the object code is executed, a call to a function in the called function list that satisfies a target predicate.

5. The method of claim 1, wherein determining that the first instruction sequence sets the first value comprises identifying a data flow from the first value to the indirect call.

6. The method of claim 1, further comprising:
   detecting, in the first function, a direct call to a third function of the object code whose identity is explicit in the direct call; and
   adding an identifier of the third function to the called function list.

7. The method of claim 1, further comprising:
   detecting, in the first function, a call to a third function of the object code prior to the indirect call to the second function; and
   detecting the conditional block in the third function.

8. The method of claim 1, further comprising:
   detecting, in the first function, a call to a third function prior to the indirect call to the second function;
   failing to detect the conditional block in the third function; and
   detecting the conditional block in the first function, wherein the conditional block occurs in the first function prior to the indirect call to the second function and prior to the call to the third function.

9. A system, comprising:
   a repository configured to store:
      object code comprising a first function, wherein the object code is generated from source code, and wherein the object code is external to the source code, and
      a called functions list for the object code;
   a memory coupled to a computer processor; and
   a tracing tool, executing on the computer processor and using the memory, configured to:
      initiate a static analysis of the object code,
      detect, in the first function of the object code and by the static analysis of the object code, an indirect call to a second function of the object code whose identity is unknown until the object code is executed, detect, in the object code, a conditional block comprising a first instruction sequence and a second instruction sequence, determine, by the static analysis, that the first instruction sequence sets a first value that identifies the second function, and add the first value to the called function list.

10. The system of claim 9, wherein the tracing tool is further configured to:

determine that the second instruction sequence sets a second value that identifies the second function; and add the second value to the called function list.

11. The system of claim 9, wherein the tracing tool is further configured to:

generate an alert when a function in the called function list satisfies a target predicate.

12. The system of claim 9, wherein the tracing tool is further configured to:

instrument the object code to intercept, when the object code is executed, a call to a function in the called function list that satisfies a target predicate.

13. The system of claim 9, wherein the tracing tool is further configured to determine that the first instruction sequence sets the first value by:

identifying a data flow from the first value to the indirect call.

14. The system of claim 9, wherein the tracing tool is further configured to:

detect, in the first function, a direct call to a third function of the object code whose identity is explicit in the direct call; and add an identifier of the third function to the called function list.

15. The system of claim 9, wherein the tracing tool is further configured to:

detect, in the first function, a call to a third function of the object code prior to the indirect call to the second function; and detect the conditional block in the third function.

16. A non-transitory computer readable medium comprising instructions that, when executed by a computer processor, perform:

initiating a static analysis of object code comprising a first function, wherein the object code is generated from source code, and wherein the object code is external to the source code;

detecting, in the first function of the object code and by the static analysis of the object code, an indirect call to a second function of the object code whose identity is unknown until the object code is executed;

detecting, in the object code, a conditional block comprising a first instruction sequence and a second instruction sequence;

determining, by the static analysis, that the first instruction sequence sets a first value that identifies the second function; and adding the first value to a called function list for the object code.

17. The non-transitory computer readable medium of claim 16, further comprising instructions that perform:

determining that the second instruction sequence sets a second value that identifies the second function; and adding the second value to the called function list.

18. The non-transitory computer readable medium of claim 16, further comprising instructions that perform:

generating an alert when a function in the called function list satisfies a target predicate.

19. The non-transitory computer readable medium of claim 16, wherein determining that the first instruction sequence sets the first value comprises:

identifying a data flow from the first value to the indirect call.

20. The non-transitory computer readable medium of claim 16, further comprising instructions that perform:

detecting, in the first function, a call to a third function of the object code prior to the indirect call to the second function; and detecting the conditional block in the third function.

* * * * *